(12) United States Patent  (10) Patent No.: US 8,773,365 B2
Hong et al.  (45) Date of Patent: Jul. 8, 2014

(54) DISPLAY APPARATUS FOR SUPPLYING POWER TO AN EXTERNAL DEVICE AND CONTROL METHOD THEREOF

(75) Inventors: Chang-wan Hong, Seongnam-si (KR); Seung-soo Kang, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 12/540,930

(22) Filed: Aug. 13, 2009

(65) Prior Publication Data

US 2010/0182251 A1    Jul. 22, 2010

(30) Foreign Application Priority Data

Jan. 19, 2009 (KR) .................. 10-2009-0004252

(51) Int. Cl.
*G06F 3/041* (2006.01)
(52) U.S. Cl.
USPC .......................................... 345/173; 320/108
(58) Field of Classification Search
USPC .................... 345/156–173; 320/108
See application file for complete search history.

(56) References Cited

U.S. PATENT DOCUMENTS

| | | | | |
|---|---|---|---|---|
| 2006/0061324 | A1* | 3/2006 | Oglesbee | 320/108 |
| 2006/0158152 | A1* | 7/2006 | Taniguchi et al. | 320/106 |
| 2006/0176015 | A1* | 8/2006 | Bersenev | 320/114 |
| 2007/0279002 | A1* | 12/2007 | Partovi | 320/115 |
| 2008/0211455 | A1* | 9/2008 | Park et al. | 320/108 |
| 2008/0211458 | A1* | 9/2008 | Lawther et al. | 320/132 |
| 2008/0258679 | A1* | 10/2008 | Manico et al. | 320/106 |
| 2009/0278493 | A1* | 11/2009 | Alden | 320/108 |

FOREIGN PATENT DOCUMENTS

| | | |
|---|---|---|
| KR | 10-2008-0021880 A | 3/2008 |
| KR | 10-2008-0032519 A | 4/2008 |

* cited by examiner

*Primary Examiner* — Viet Pham
(74) *Attorney, Agent, or Firm* — Sughrue Mion, PLLC (57) ABSTRACT

Disclosed is a display apparatus including: a display unit; a power supply unit which supplies power to at least one external device; and a controller which displays on the display unit an at least one indicating image indicating an at least one power supply area of the display unit supplying power to the at least one external device, and controls the power supply unit to supply power to the at least one external device placed on the at least one power supply area in a wireless manner.

21 Claims, 8 Drawing Sheets

DISPLAY APPARATUS FOR SUPPLYING POWER TO AN EXTERNAL DEVICE AND CONTROL METHOD THEREOF

CROSS-REFERENCE TO RELATED APPLICATION

This application claims priority from Korean Patent Application No. 10-2009-0004252, filed on Jan. 19, 2009, in the Korean Intellectual Property Office, the disclosure of which is incorporated herein by reference.

BACKGROUND OF THE INVENTION

1. Field of the Invention

Apparatuses and methods consistent with the present invention relate to a display apparatus which displays an image and a control method thereof, and more particularly, to a display apparatus which supplies power to an external device, and a control method thereof.

2. Description of the Related Art

A display apparatus processes an image signal or image data which are supplied externally or stored therein to display an image on a screen. With development of related or associated technologies, the display apparatus also includes and incorporates various functions for a user's convenience other than the existing function of displaying an image. For example, a port or a connector is installed in the display apparatus to communicate with an external device, and a user may connect such a port with the external device in a wired manner for data transmission between the external device and the display apparatus.

Other than such data transmission, a conventional display apparatus may supply power to an external device that is connected with a port. That is, the display apparatus supplies power to the external device after adjusting the power to a proper level so as to charge a battery of the external device.

However, as for the display apparatus, a port should be additionally installed in an external side of the display apparatus to supply power to the external device, and a cable is also needed to connect the external device and the display apparatus.

SUMMARY OF THE INVENTION

The foregoing and/or other aspects of the present invention can be achieved by providing a display apparatus including: a display unit; a power supply unit which supplies power to an external device; and a controller which displays on the display unit a preset image indicating a part of the display unit supplying power to the external device, and controls the power supply unit to supply power to the external device placed on the displayed preset image in a wireless manner.

The display apparatus may further include an external device detector which detects whether the external device is placed on the displayed preset image, wherein the controller controls the power supply unit to supply power to the external device if the external device detector detects the external device.

The external device detector may include a piezo electric sensor, an ultrasonic sensor or a photo sensor.

The display apparatus may further include a user input unit, wherein the controller controls the display unit to display the preset image if a preset command is inputted through the user input unit.

The controller may further display a message related to the preset image if a preset command is inputted through the user input unit.

The display apparatus may further include a user location detector which detects a location of a user, wherein the controller displays a message related to the preset image on a part of the display unit adjacent to the location of a user detected by the user location detector.

The display apparatus may further include a touch detector which detects a touched location on the display unit, wherein the controller displays the preset image if a preset command is inputted through the touch detector.

The controller may control the display unit to display a message related to the preset image on the touched location of the display unit.

The controller may control the display unit not to display the preset image if it is determined that power supply to the external device is completed.

A displaying side of the display unit may be arranged to be opposite to an installation surface.

Another aspect of the present invention may be achieved by providing a control method of a display apparatus, the control method including: displaying on a display unit a preset image indicating a part of the display unit supplying power to an external device; and supplying power to the external device placed on the displayed preset image in a wireless manner.

The supplying power to the external device in a wireless manner may include detecting whether the external device is placed on the displayed preset image; and supplying power to the external device if the external device is detected.

The displaying the preset image on the display unit may include receiving a preset command; and displaying the preset image corresponding to the preset command.

The displaying the preset image corresponding to the preset command may include displaying a message related to the preset image.

The displaying the message related to the preset image may include detecting a location of a user inputting the preset command; and displaying the message on a part of the display unit adjacent to the detected location of a user.

The inputting the preset command may include inputting the preset input by touching the display unit.

The displaying the preset image on the display unit may further include detecting a touched location of the display unit; and displaying a message related to the preset image on the detected location of the display unit.

The supplying power to the external device in a wireless manner may include suspending the display of the preset image on the display unit if it is determined that the power supply to the external device is completed.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
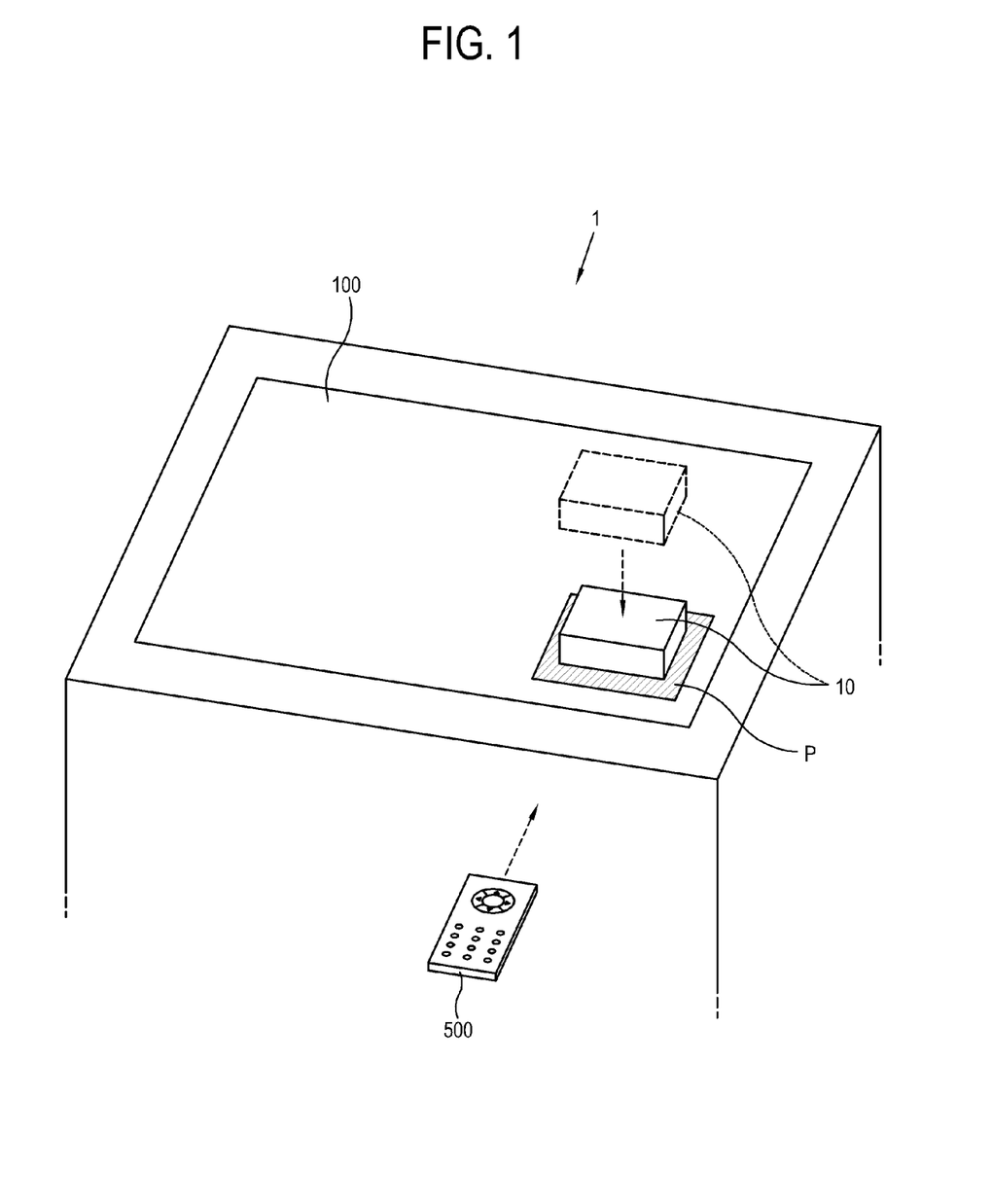
FIG. 1 illustrates a display apparatus according to a first exemplary embodiment of the present invention.

FIG. 1 illustrates a display apparatus 1 according to a first exemplary embodiment of the present invention. The display apparatus 1 according to the present exemplary embodiment may include a general device which displays an image, and the present invention may apply to a TV or a monitor, regardless of its use.

As shown therein, the display apparatus 1 includes a display unit 100 which displays an image thereon. The display unit 100 according to the present exemplary embodiment is placed in a transverse direction with respect to an installation surface, i.e., a displaying side thereof is to be opposite to the installation surface or ground. That is, an image which is displayed on the display unit 100 is directed upward and a user may look down the image while standing or sitting. As the display unit 100 is parallel to the ground, a user may additionally place an external device 10 on the display unit 100.

Embodiments of the external device 10 are not limited, and may include general electronic devices such as a communication terminal which a user may easily carry. In the present exemplary embodiment, the external device 10 includes a portable media player to play an image or an audio, but the spirit of the present invention is not limited thereto. The external device 10 includes a power battery (not shown) for operation, and the battery may be charged by receiving power from the display apparatus 1 wirelessly.

If the external device 10 is placed on a specific power supply area of the display unit 100, the display apparatus 1 may supply power to the external device 10 wirelessly. This power supply area means a preset area through which the display apparatus 1 supplies power to the external device 10.

As a preset area indication image P is displayed on the display unit 100 to display the power supply area, a user may confirm the area which can supply power to the external device 10. That is, a user may place the external device 10 on the area indication image P displayed on the display unit 100 to thereby wirelessly supply power to the external device 10.

The form, shape and size of the area indication image P are not limited, but the area indication image P is displayed corresponding to the power supply area. The area indication image P according to the present exemplary embodiment is displayed as only one image, but may be plurally displayed if there is a plurality of power supply areas.

The area indication image P may be displayed from the point of time when an image is displayed on the display unit 100. Provided, the area indication image P is preferably displayed when a preset command is inputted through a user input unit 500. Then, the area indication image P does not overlay an additional image that is being displayed on the display unit 100 while power is not supplied to the external device 10.

Figure 2:
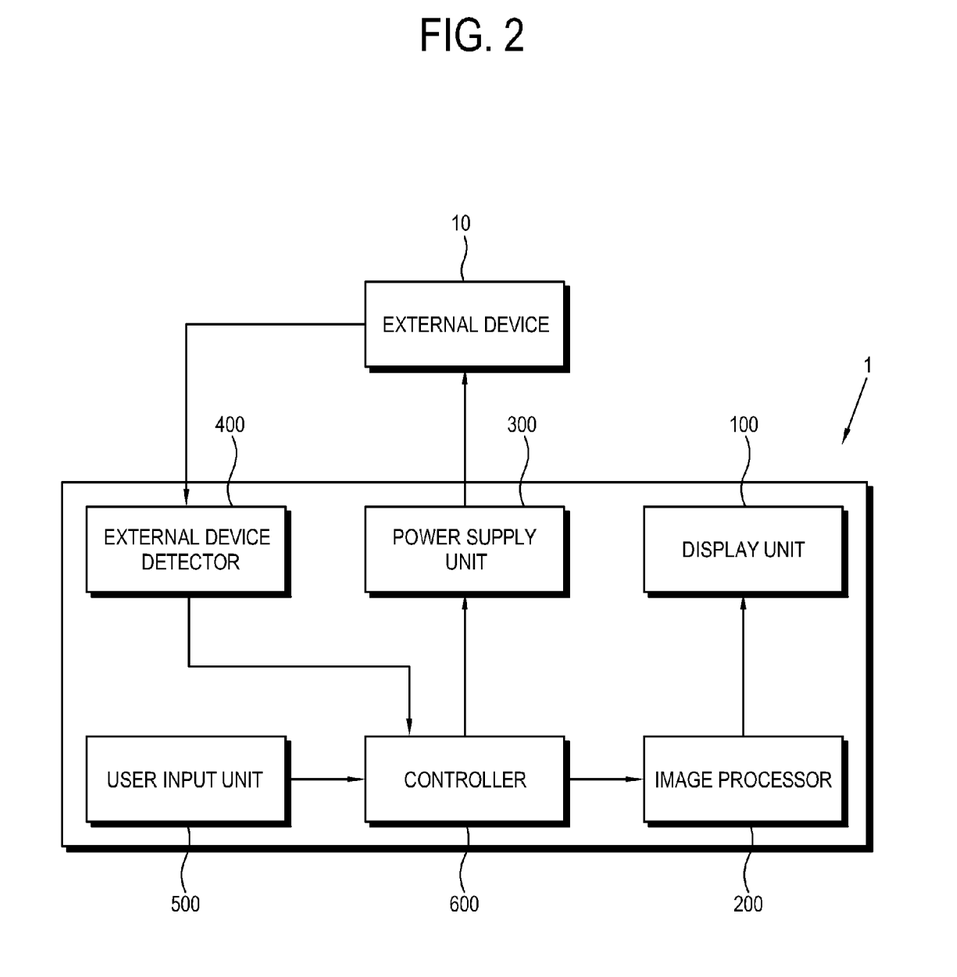
FIG. 2 is a block diagram of the display apparatus in FIG. 1.

Hereinafter, the detail configuration of the display apparatus 1 will be described with reference to FIG. 2. FIG. 2 is a block diagram of the display apparatus 1 according to the present exemplary embodiment.

As shown therein, the display apparatus 1 includes the display unit 100, a power supply unit 300 which wirelessly supplies power to the external device 10, and a controller 600 which displays on the display unit 100 the area indication image P indicating the power supply area where power is supplied by the power supply unit 300. The controller 600 controls the power supply unit 300 to supply power to the external device 10 placed on the area indication image P.

The display apparatus 1 further includes an image processor 200 which processes an image signal or image data to be displayed on the display unit 100, an external device detector 400 which detects whether the external device 10 is placed on the area indication image P, and a user input unit 500 which receives a preset command by a user's manipulation.

The display unit 100 displays a still image or a moving picture that is processed by the image processor 200. The configuration of the display unit 100 that displays the image as described above is not limited. For example, the display unit 100 may include a projection display which uses a digital micromirror device (DMD). The display unit 100 may be realized in various ways such as a liquid crystal display (LCD), a plasma display panel (PDP), a light emitting diode (LED) display, an organic light emitting diode (OLED), a surface-conduction electron emitter display, a carbon nanotube display, a nano-crystal display, etc.

The image processor 200 processes an image signal supplied by an external image supply source (not shown) or image data stored in the display apparatus 1 to display an image. The image processor 200 includes an image processing block (not shown) which performs functions of a decoder, a scaler, a picture quality enhancer, etc. Such respective image processing blocks may be integrated into a single chip.

The image processor 200 processes the area indication image P to be displayed on the display unit 100 by a control of the controller 600. The image processor 200 overlays the area indication image P on an image displayed on the display unit 100 to enable a user to confirm the area indication image P. In this case, the image processor 200 may process the area indication image P into an on screen display (OSD) or a pop-up.

The power supply unit 300 supplies power to the external device 10 that is placed on the preset power supply area indicated the area indication image P of the display unit 100. As the external device 10 is spaced from the power supply unit 300 by the display unit 100, the power supply unit 300 supplies power to the external device 10 in a wireless manner.

The power supply unit 300 may employ various configurations to supply power in a wireless manner. For example, the power supply unit 300 may employ a configuration that a primary coil and a secondary coil are formed in the power supply unit 300 and the external device 10, respectively, and power is transmitted from the primary coil to the secondary coil by an induced current. But this is an exemplary embodiment of the present invention and does not limit the spirit of the present invention.

The external device detector 400 detects whether the external device 10 is placed on the area indication image P, and informs the result of detection to the controller 600. If the external device detector 400 detects the external device 10, the controller 600 controls the power supply unit 300 to supply power to the external device 10.

The external device detector 400 may detect the external device 10 regardless of whether the area indication image P is displayed, or only when the area indication image P is displayed. As for the former case, the external device detector 400 may detect the external device 10 if the external device 10 is placed on the power supply area indicated by the area indication image P even while the area indication image P is not displayed.

As for the latter case, the external device detector 400 does not detect the external device 10 even if the external device 10 is placed on the power supply area while the area indication image P is not displayed. That is, the external device detector 400 is in an off state while the area indication image P is not displayed, and may be changed into an on state by the controller 600 when the area indication image P is displayed.

The external device detector 400 may include various configurations, e.g., a photo sensor, an ultrasonic sensor or a piezo-electric sensor to detect the external device 10. The photo sensor detects the external device 10 by emitting light and interruption of the external device 10 with respect to the light. The ultrasonic sensor emits ultrasonic waves and detects the external device 10. The ultrasonic sensor may detect the external device 10 more accurately than the photo sensor, by which light may be diffused. The piezo-electric sensor detects the external device 10 based on a principle that a piezo electric element forms a current by the load of the external device 10. Other than those described above, the external device detector 400 which detects the external device 10 may vary.

The user input unit 500 receives a user's input and transmits a command corresponding to the input to the controller 600. Thus, the controller 600 may perform a control operation corresponding to the transmitted command. The user input unit 500 may include a menu key installed in an external side of the display apparatus 1, a remote controller, etc.

The user input unit 500 may be manipulated by a user to display the area indication image P on the display unit 100. If a user inputs a command through the user input unit 500, the controller 600 displays the area indication image P accordingly.

If an input is received through the user input unit 500 to display the area indication image P, the controller 600 controls the image processor 200 to display the area indication image P on the display unit 100 corresponding to the input. If the external device detector 400 detects that the external device 10 is placed on the area indication image P, the controller 600 controls the power supply unit 300 to supply power to the external device 10 placed on the area indication image P in a wireless manner.

The controller 600 determines the point of time when the power supply to the external device 10 is completed, and may suspend the power supply to the external device 10 by controlling the power supply unit 300 at this point of time. Since the external device 10 needs not be placed on the area indication image P at that point of time, the controller 600 controls the image processor 200 not to display the area indication image P.

Here, the point of time when the power supply to the external device 10 by the power supply unit 300 is completed may be designated in various ways. For example, if a battery (not shown) of the external device 10 is charged, the point of time when the battery charging is completed may be designated as the point of time when the power supply is completed. Such design may be changed variously in embodiments of the present invention.

Figure 3:
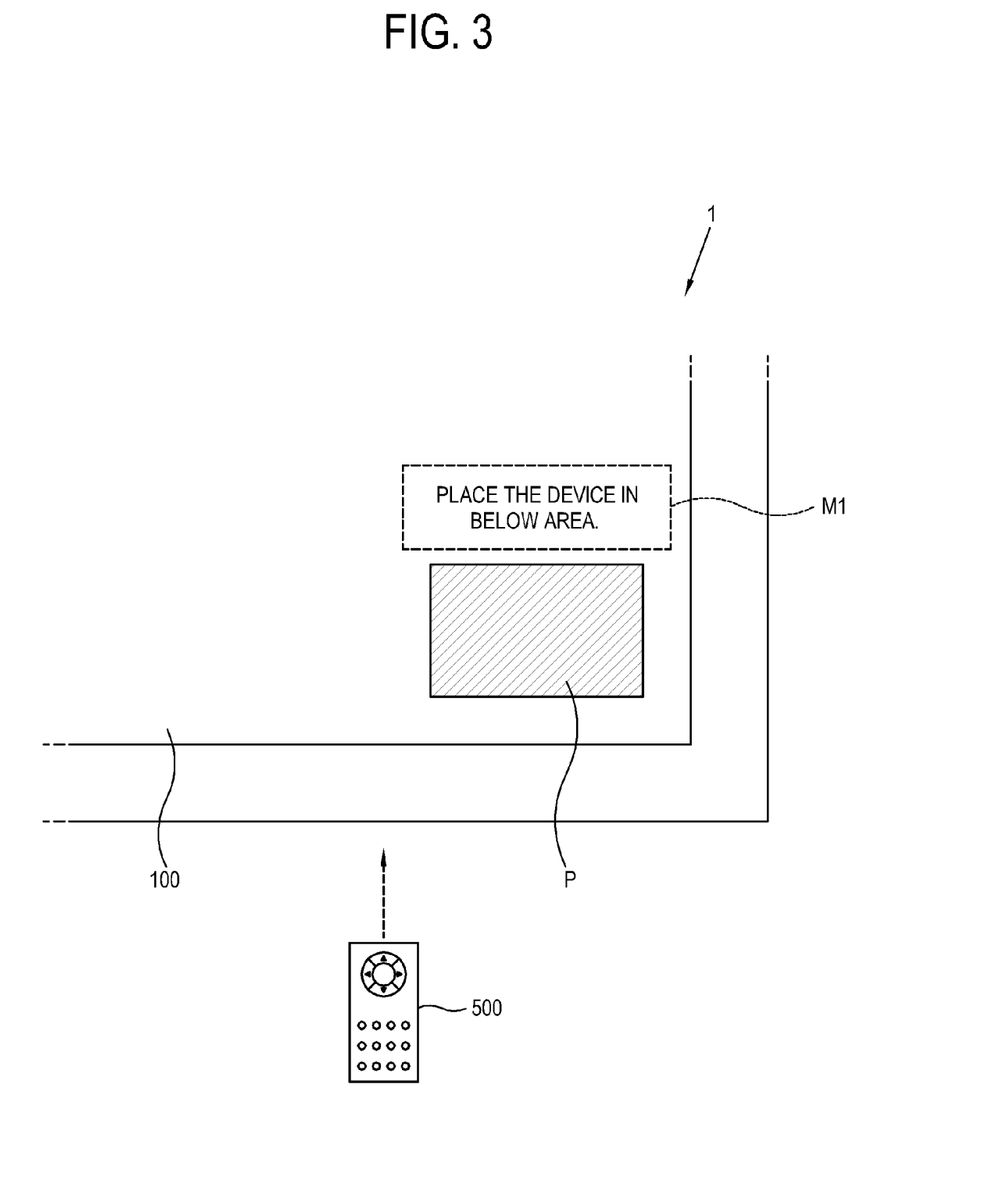
FIG. 3 illustrates an area indication image and a message which are displayed on the display apparatus in FIG. 1.

Meanwhile, the controller 600 may display a message M1 including a text, a symbol or a design demonstrating information relative to the area indication image P when displaying the area indication image P. FIG. 3 illustrates the area indication image P and a relative message.

As shown in FIG. 3, if a preset command is inputted through the user input unit 500, the controller 600 controls the image processor 200 to display the area indication image P. Here, the controller 600 further displays the message M1 to explain the area indication image P so that a user easily acknowledges the area indication image P.

FIG. 3 illustrates the message M1 that is adjacent to the area indication image P, but the message M1 may be incorporated into the area indication image P.

The message M1 may include various information, e.g., preset information about whether the area indication image P is displayed or what the displayed area indication image P is about.

Figure 4:
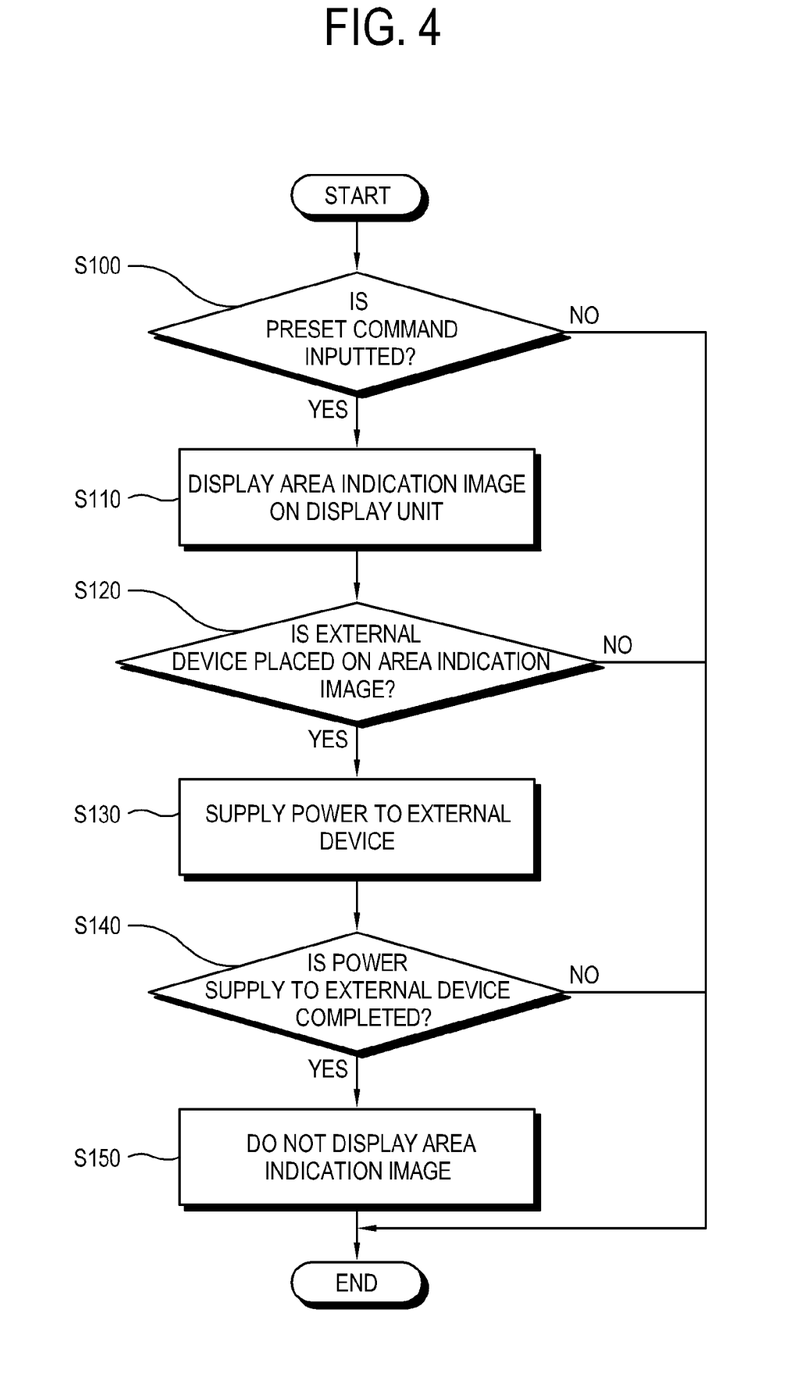
FIG. 4 is a control flowchart which describes a control method of the display apparatus according to the first exemplary embodiment of the present invention.

With the foregoing configuration, a method of supplying power to the external device 10 by the display apparatus 1 according to the present exemplary embodiment will be described with reference to FIG. 4. FIG. 4 is a control flowchart which describes the power supply method.

Here, the state where the display unit 100 does not display the area indication image P thereon is an initial state.

As shown therein, the controller 600 determines whether a preset input is received to display the area indication image P (S100). If a user inputs a preset command through the user input unit 500, the controller 600 controls the display unit 100 to display thereon the area indication image P (S110).

If the area indication image P is displayed, the controller 600 determines whether the external device 10 is placed on the area indication image P (S120). To that end, the external device detector 400 detects the external device 10 and informs the controller 600 of the detection if a user places the external device 10 on the area indication image P.

If it is determined that the external device 10 is placed on the area indication image P, the controller 600 controls the power supply unit 300 to supply power to the external device 10. Then, the power supply unit 300 supplies power to the external device 10 until the preset point of time arrives (S130).

The controller 600 determines whether the power supply to the external device 10 is completed (S140), and controls the display unit 100 not to display thereon the area indication image P if the power supply is determined to be completed (S150). The controller 600 cuts off power supplied by the power supply unit 300 to the external device 10. A user displaces the external device 10 which finishes power supply, from the display apparatus 100.

As described above, the display unit 100 displays thereon the area indication image P to indicate the area where power supply to the external device 10 is available and the external device 10 placed on the area indication image P may receive power in a wireless manner.

In the foregoing first exemplary embodiment, the display unit 100 and the user input unit 500 are provided separately, and the message M1 which is relative to the area indication image P is adjacent to the area indication image P. But the spirit of the present invention is not limited thereto. Hereinafter, a display apparatus 1 according to a second exemplary embodiment, which employs a configuration different from the first exemplary embodiment, will be described with reference to FIGS. 5 and 6.

Figure 5:
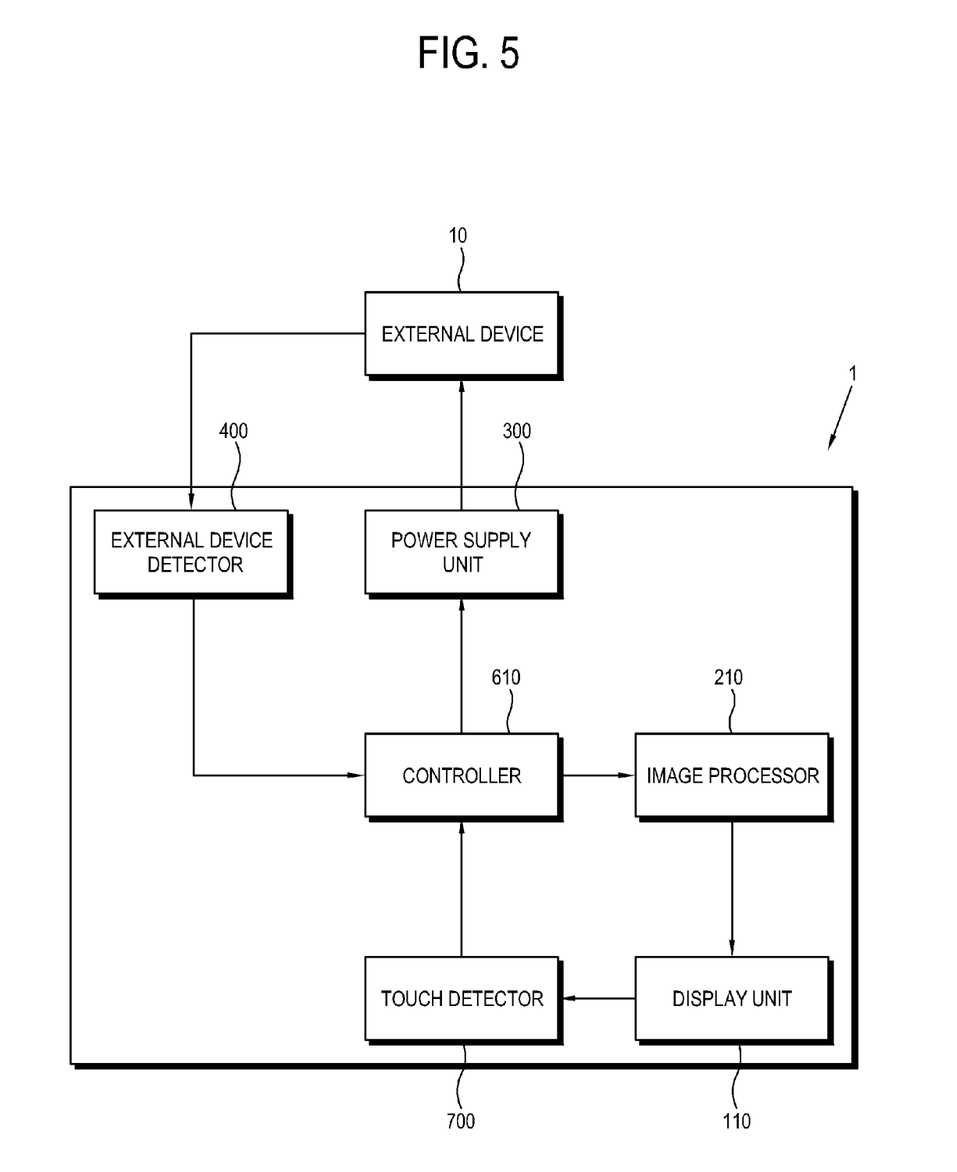
FIG. 5 is a block diagram of a display apparatus according to a second exemplary embodiment of the present invention.
Figure 6:
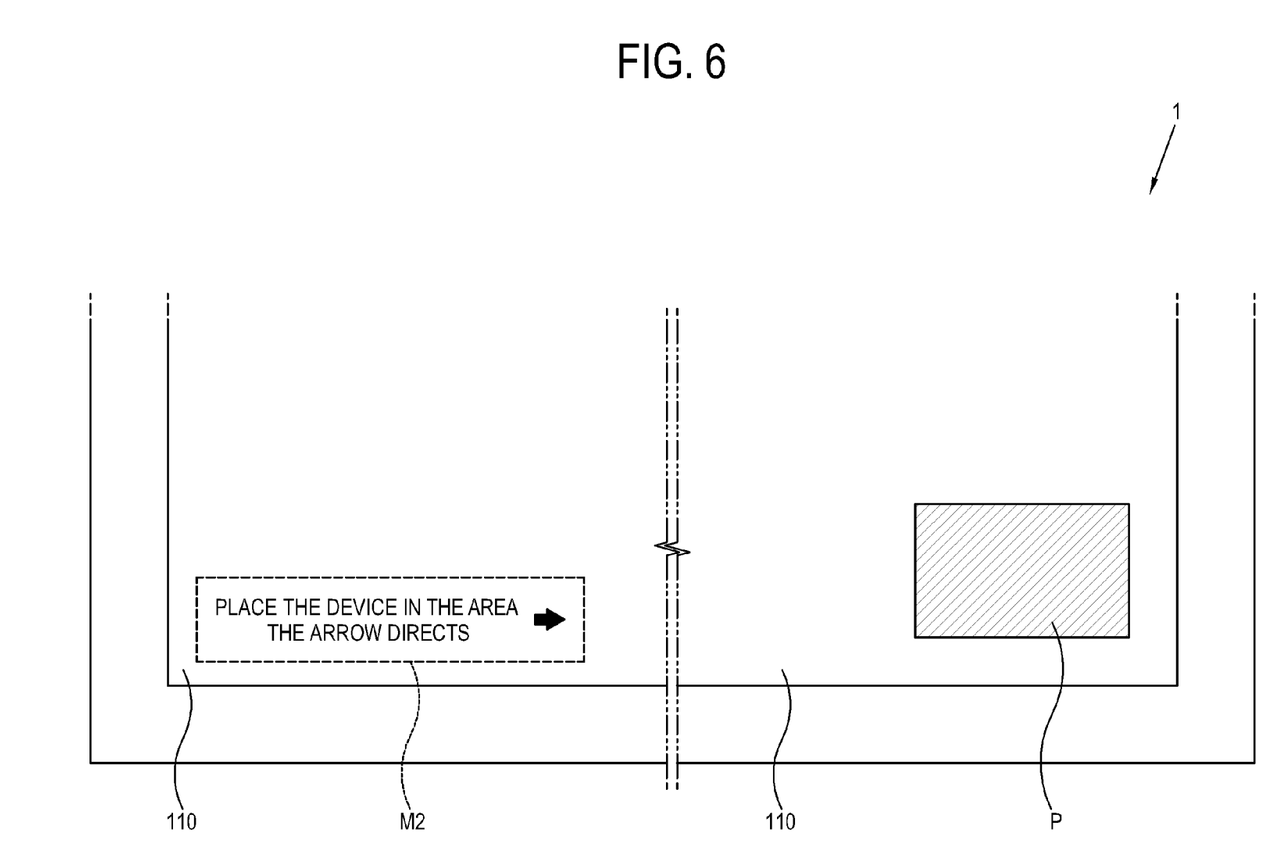
FIG. 6 illustrates an area indication image and a message which are displayed on the display apparatus in FIG. 5.

FIG. 5 is a block diagram of the display apparatus 1 according to the second exemplary embodiment of the present invention. FIG. 6 illustrates the display apparatus 1 which displays an area indication image P and a message M2 according to the second exemplary embodiment of the present invention.

As shown in FIG. 5, according to the present exemplary embodiment, a display unit 110 may include a touch panel or a touch screen, and transmit a user's input to a controller 610.

An image processor 210 processes an input menu (not shown), which may be manipulated by a user, to be displayed on the display unit 110. A user may directly touch the display unit 110 to input a preset command.

The controller 610 may display the area indication image P corresponding to a user's input if a user inputs the command through the display unit 110.

However, a user's location is far from an indication location of the area indication image P, and thus he/she may not acknowledge whether the area indication image P is displayed or the location of the area indication image P.

Thus, the display apparatus 1 further includes a touch detector 700 to detect a location of the display unit 110 that a user touches. The touch detector 700 may vary including an infrared ray sensor, a temperature detecting sensor, a piezo electric sensor, etc. The touch detector 700 may be incorporated into the display unit 110.

The controller 610 may further display a message M2 related to the area indication image P, on a touched location detected by the touch detector 700 when displaying the area indication image P. This is as shown in FIG. 6.

As shown therein, if a user inputs a preset command by touching a predetermined location of the display unit 110, the controller 610 displays the area indication image P corresponding to the command.

The controller 610 further displays the message M2 related to the area indication image P on the location that a user touches, i.e., the message M2 including information about the indication location and about whether the area indication image P is displayed.

As the configuration and operation of an external device detector 400 and a power supply unit 300 according to the present exemplary embodiment is applicable to those according to the first exemplary embodiment, the description will be avoided.

Thus, a user may easily confirm the area indication image P according to information of the message M2.

Figure 7:
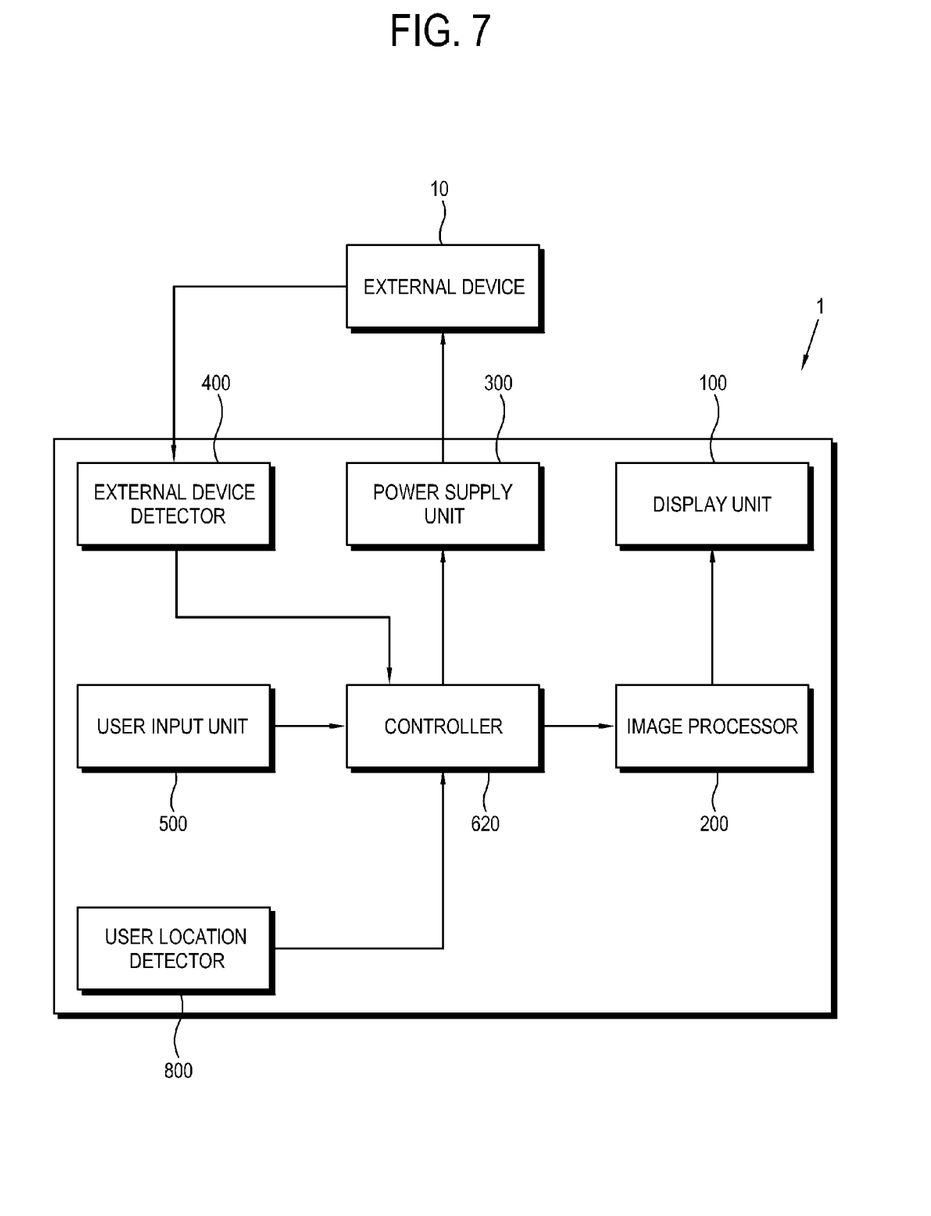
FIG. 7 is a block diagram of a display apparatus according to third exemplary embodiment of the present invention.
Figure 8:
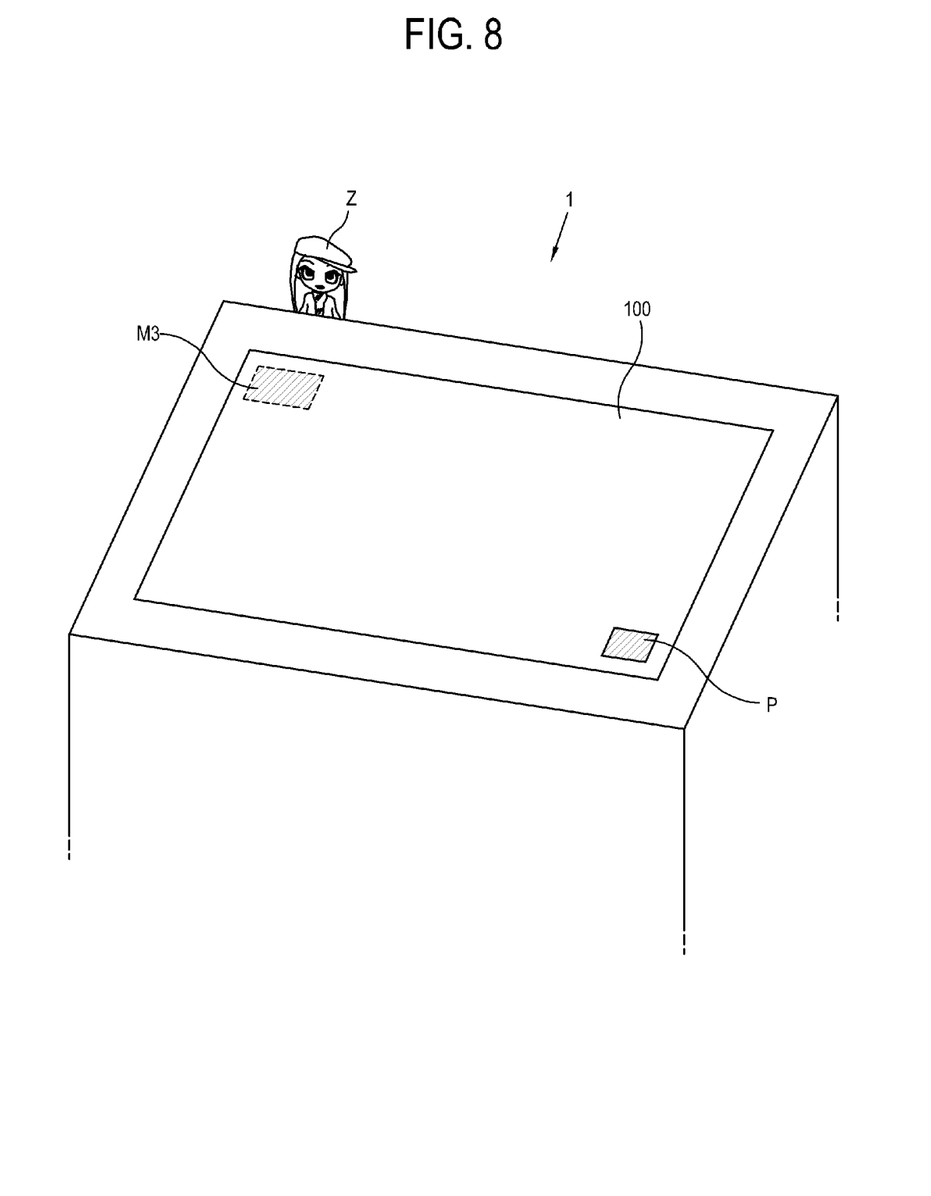
FIG. 8 illustrates an area indication image and a message which are displayed on the display apparatus in FIG. 7.

In the second exemplary embodiment, the controller 610 displays on the display unit 110 the message M2 related to the area indication image P on the location touched by a user. A display apparatus 1 according to a third exemplary embodiment which has a configuration different from that according to the second exemplary embodiment will be described with reference to FIGS. 7 and 8. FIG. 7 is a block diagram of a display apparatus 1 according to a third exemplary embodiment of the present invention. FIG. 8 illustrates an area indication image P and a message M3 that are displayed on the display apparatus 1 according to the third exemplary embodiment of the present invention.

As shown in FIG. 7, the display apparatus 1 according to the present exemplary embodiment includes a user location detector 800 which detects a user's location. Other elements are applicable to those according to the first exemplary embodiment, and the description will be avoided.

If a preset command, i.e., a preset command to display an area indication image P on a display unit 100 is inputted, the user location detector 800 detects a location of a user corresponding to the command.

The user location detector 800 detects the location of a user, and transmits the information about the detected location to the controller 620. The user location detector 800 may vary including a photo sensor, an ultrasonic sensor, a heat detecting sensor detecting temperatures of a user, a motion detecting sensor detecting a user's motion, etc.

As shown in FIG. 8, the controller 620 displays the area indication image P on the display unit 100 as a preset command is inputted through the user input unit 500. The controller 620 displays a message M3 related to the area indication image P on a part of the display unit 100 adjacent to a user's location Z according to user location information received from the user location detector 800.

As in FIG. 8, a user is located in an upper part of the drawing spaced from the area indication image P displayed in a lower side of the drawing. The user location detector 800 detects the user's location Z, and the controller 620 displays the message M3 on the location of the display unit 100 that is adjacent to the detected location Z.

The message M3 may include information about the indication location and about whether the area indication image P is displayed. A user may confirm the message M3 even when he/she is far from the area indication image P, thereby easily acknowledging the indication location and whether the area indication image P is displayed.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a display unit;
   a power supply unit which supplies power to an external device;
   a controller which displays a graphic user interface (GUI) on the display unit if a user's input is sensed, determines whether the external device is placed on the GUI, and controls the power supply unit to charge the external device with power supplied from the power supply unit if it is determined that the external device is placed on the GUI, wherein the GUI indicates a power supply area of the display unit supplying power from the power supply unit;
   a user location detector which detects a location of a user with respect to the display apparatus,
   wherein the controller displays a message related to the GUI on a part of the display unit adjacent to the location of the user detected by the user location detector,
   wherein the GUI is displayed on the display unit before the external device is placed on the GUI and the GUI is displayed in a fixed location on the display unit.

2. The display apparatus according to claim 1, further comprising an external device detector which detects whether the external device is placed on the GUI, wherein
   the controller controls the power supply unit to supply power to the external device if the external device detector detects the external device.

3. The display apparatus according to claim 2, wherein the external device detector comprises at least one from among a piezo electric sensor, an ultrasonic sensor or a photo sensor.

4. The display apparatus according to claim 1, further comprising a user input unit, wherein
   the controller displays the GUI if a command is inputted through the user input unit.

5. The display apparatus according to claim 4, wherein the controller further displays a message related to the GUI if a different command is inputted through the user input unit.

6. The display apparatus according to claim 1, further comprising a touch detector which detects a touched location on the display unit, wherein the controller displays the GUI if a command is inputted through the touch detector.

7. The display apparatus according to claim 6, wherein the controller displays a message related to the GUI on the touched location of the display unit.

8. The display apparatus according to claim 1, wherein the controller stops displaying the GUI if it is determined that power supply to the external device is completed.

9. The display apparatus according to claim 1, wherein a displaying side of the display unit is arranged to be opposite to an installation surface of the display apparatus.

10. A control method of a display apparatus, the control method comprising:
displaying a graphic user interface (GUI) on a display unit if a user's input is sensed;
determining whether the external device is placed on the GUI; and
charging the external device if it is determined that the external device is placed on the GUI, wherein the GUI indicates a power supply area on the display unit,
wherein the displaying the GUI on the display unit is performed before the external device is placed on the GUI, and
wherein the displaying the message related to the GUI comprises:
detecting a location of a user with respect to the display apparatus inputting the command; and
displaying the message on a part of the display unit adjacent to the detected location of the user,
wherein the displayed GUI is displayed at a fixed location on the display unit.

11. The control method according to claim 10, wherein the charging the external device comprises detecting whether the external device is placed on the power supply area; and supplying power to the external device if the external device is detected.

12. The control method according to claim 10, wherein the displaying the GUI on the display unit comprises receiving a command; and
displaying the GUI corresponding to the command.

13. The control method according to claim 12, wherein the displaying the GUI corresponding to the command comprises displaying a message related to the GUI.

14. The control method according to claim 12, wherein the inputting the command comprises touching the display unit.

15. The control method according to claim 14, wherein the displaying the GUI on the display unit further comprises detecting a touched location of the display unit; and
displaying a message related to the GUI on the detected location of the display unit.

16. The control method according to claim 10, wherein the charging the external device comprises suspending the display of the GUI on the display unit if it is determined that the power supply to the external device is completed.

17. The display apparatus according to claim 5, wherein the message indicates where to place said external device.

18. The control method according to claim 13, wherein the message indicates where to place said external device.

19. The display apparatus according to claim 1, wherein the controller displays a plurality of GUIs on the display unit.

20. The display apparatus according to claim 19, wherein the GUIs correspond to power supply areas.

21. The display apparatus according to claim 1, wherein the display apparatus is powered ON, and the controller determines whether the external device is placed on the GUI, only while the GUI is displayed on the display unit.

* * * * *